(12) United States Patent
Kisara et al.

(10) Patent No.: US 8,237,901 B2
(45) Date of Patent: Aug. 7, 2012

(54) LIQUID CRYSTAL DISPLAY DEVICE WITH RETARDATION PLATES

(75) Inventors: Emi Kisara, Ishikawa-gun (JP);
Kazuhiro Nishiyama, Kanazawa (JP);
Mitsutaka Okita, Hakusan (JP);
Shigesumi Araki, Kanazawa (JP)

(73) Assignee: Japan Display Central Inc., Fukaya-shi (JP)

( * ) Notice: Subject to any disclaimer, the term of this patent is extended or adjusted under 35 U.S.C. 154(b) by 0 days.

(21) Appl. No.: 13/282,651

(22) Filed: Oct. 27, 2011

(65) Prior Publication Data

US 2012/0038870 A1 Feb. 16, 2012

Related U.S. Application Data

(63) Continuation of application No. 11/828,583, filed on Jul. 26, 2007, now abandoned.

(30) Foreign Application Priority Data

Jul. 26, 2006 (JP) ................................ 2006-203860
Jul. 13, 2007 (JP) ................................ 2007-184426

(51) Int. Cl.
*G02F 1/1335* (2006.01)

(52) U.S. Cl. ........ 349/119; 349/117; 349/118; 349/120; 349/121

(58) Field of Classification Search ........... 349/117–121
See application file for complete search history.

(56) References Cited

U.S. PATENT DOCUMENTS

| | | | |
|---|---|---|---|
| 6,476,950 B1 | 11/2002 | Claramella | |
| 6,628,369 B2 | 9/2003 | Kumagai et al. | |
| 6,667,835 B2 | 12/2003 | Yano et al. | |
| 6,922,222 B2 | 7/2005 | Miyachi et al. | |
| 6,965,474 B2 * | 11/2005 | Johnson et al. | 359/489.07 |
| 6,977,700 B2 * | 12/2005 | Uesaka et al. | 349/114 |
| 6,995,816 B2 | 2/2006 | Mi et al. | |
| 7,075,606 B2 | 7/2006 | Hoff et al. | |
| 7,215,839 B2 | 5/2007 | Kawahara et al. | |
| 7,253,860 B2 * | 8/2007 | Chang | 349/118 |

(Continued)

FOREIGN PATENT DOCUMENTS

JP 2003-107477 4/2003

(Continued)

OTHER PUBLICATIONS

Office Action issued on Jul. 18, 2011 in the corresponding Taiwan Patent Application No. 096126947.

*Primary Examiner* — Hoan C Nguyen
(74) *Attorney, Agent, or Firm* — Oblon, Spivak, McClelland, Maier & Neustadt, L.L.P.

(57) ABSTRACT

A liquid crystal display device includes an OCB mode liquid crystal display panel, and an optical compensation element which is disposed outside of the liquid crystal display layer. The optical compensation element includes a polarizer plate, a first retardation plate which is disposed between the polarizer plate and the liquid crystal layer, and a second retardation plate which is disposed between the polarizer plate and the first retardation plate and has a biaxial refractive index anisotropy. The optical compensation element compensates a difference of a polarization state that differs between azimuth directions of light passing through the liquid crystal layer and compensates a shift of the polarization state of light, which passes through the retardation plate, from an azimuth direction of an absorption axis of the polarizer plate.

3 Claims, 14 Drawing Sheets

| | | | | | First example of structure | | Modification 1 | |
|---|---|---|---|---|---|---|---|---|
| Second optical compensation element (50) | Second polarizer plate (PL2) | | | Absorption axis | 135° | | 135° | |
| | Fourth retardation plate (R4) | | λ/2 plate (biaxial) | Slow axis | 45° | Nz= 0.15~0.3 | 135° | Nz= 0.7~0.9 |
| | Third retardation plate (R3) | | λ/4 plate | Slow axis | 90° | | 90° | |
| | Second compensation layer (CL2) | Retardation plate (RC) | C-plate | – | – | | – | |
| | | Retardation plate (RA) | A-plate | Slow axis | 90° | | 90° | |
| Liquid crystal display panel (1) | | | OCB mode | Rubbing direction | 0° | | 0° | |
| First optical compensation element (40) | First compensation layer (CL1) | Retardation plate (RA) | A-plate | Slow axis | 90° | | 90° | |
| | | Retardation plate (RC) | C-plate | – | – | | – | |
| | First retardation plate (R1) | | λ/4 plate | Slow axis | 0° | | 0° | |
| | Second retardation plate (R2) | | λ/2 plate (biaxial) | Slow axis | 45° | Nz= 0.7~0.9 | 135° | Nz= 0.15~0.3 |
| | First polarizer plate (PL1) | | | Absorption axis | 45° | | 45° | |

U.S. PATENT DOCUMENTS

| | | |
|---|---|---|
| 2006/0114381 A1 | 6/2006 | Yang et al. |
| 2008/0049005 A1 | 2/2008 | Okita et al. |
| 2008/0291372 A1 | 11/2008 | Higano et al. |
| 2009/0002609 A1 | 1/2009 | Okita et al. |
| 2009/0052032 A1 | 2/2009 | Ito et al. |

FOREIGN PATENT DOCUMENTS

| | | |
|---|---|---|
| JP | 2005-164957 | 6/2005 |
| TW | M269469 | 7/2005 |

* cited by examiner

| First optical compensation element (40) | Liquid crystal display panel (1) | |
|---|---|---|
| | First compensation layer (CL1) | Retardation plate RA (A-plate) |
| | | Retardation plate RC (C-plate) |
| | First retardation plate (R1) | |
| | Second retardation plate (R2) | |
| | First polarizer plate (PL1) | |

F I G. 4A

| First optical compensation element (40) | Liquid crystal display panel (1) | |
|---|---|---|
| | First compensation layer (CL1) | Retardation plate RB (biaxial) |
| | First retardation plate (R1) | |
| | Second retardation plate (R2) | |
| | First polarizer plate (PL1) | |

F I G. 4B

| First optical compensation element (40) | Liquid crystal display panel (1) | |
|---|---|---|
| | First compensation layer (CL1) | Retardation plate Rwv (wide view) |
| | First retardation plate (R1) | |
| | Second retardation plate (R2) | |
| | First polarizer plate (PL1) | |

F I G. 4C

| First optical compensation element (40) | Liquid crystal display panel (1) | |
|---|---|---|
| | First compensation layer (CL1) | Retardation plate RA (A-plate) |
| | First retardation plate (R1) (biaxial) | |
| | Second retardation plate (R2) | |
| | First polarizer plate (PL1) | |

F I G. 4D

| | | | First example of structure | | Modification 1 | |
|---|---|---|---|---|---|---|
| Second optical compensation element (50) | Second polarizer plate (PL2) | | Absorption axis | 135° | | 135° | |
| | Fourth retardation plate (R4) | λ/2 plate (biaxial) | Slow axis | 45° | Nz=0.15~0.3 | 135° | Nz=0.7~0.9 |
| | Third retardation plate (R3) | λ/4 plate | Slow axis | 90° | – | 90° | – |
| | Second compensation layer (CL2) | Retardation plate (RC) C-plate | – | – | | – | |
| | | Retardation plate (RA) A-plate | Slow axis | 90° | | 90° | |
| Liquid crystal display panel (1) | | OCB mode | Rubbing direction | 0° | | 0° | |
| First optical compensation element (40) | First compensation layer (CL1) | Retardation plate (RA) A-plate | Slow axis | 90° | | 90° | |
| | | Retardation plate (RC) C-plate | – | – | | – | |
| | First retardation plate (R1) | λ/4 plate | Slow axis | 0° | – | 0° | – |
| | Second retardation plate (R2) | λ/2 plate (biaxial) | Slow axis | 45° | Nz=0.7~0.9 | 135° | Nz=0.15~0.3 |
| | First polarizer plate (PL1) | | Absorption axis | 45° | | 45° | |

F I G. 7

| | | Second example of structure | | |
|---|---|---|---|---|
| | Second polarizer plate (PL2) | | Absorption axis | 135° |
| Second optical compensation element (50) | Third retardation plate (R3) | λ/4 plate | Slow axis | 90° |
| | Retardation plate (RC) | C-plate | - | - |
| | Retardation plate (RA) | A-plate | Slow axis | 90° |
| | Second compensation layer (CL2) | | | |
| Liquid crystal display panel (1) | | OCB mode | Rubbing direction | 0° |
| First optical compensation element (40) | First compensation layer (CL1) | | | |
| | Retardation plate (RA) | A-plate | Slow axis | 90° |
| | Retardation plate (RC) | C-plate | - | - |
| | First retardation plate (R1) | λ/4 plate | Slow axis | 0° |
| | Second retardation plate (P2) | λ/2 plate (biaxial) | Slow axis | 45° | Nz= 0.4~0.6 |
| | First polarizer plate (PL1) | | Absorption axis | 45° |

| | | Modification 2 | | |
|---|---|---|---|---|
| | Second polarizer plate (PL2) | | Absorption axis | 135° |
| | Second retardation plate (P2) | λ/2 plate (biaxial) | Slow axis | 135° | Nz= 0.4~0.6 |
| | Third retardation plate (R3) | λ/4 plate | Slow axis | 90° |
| | Second compensation layer (CL2) | C-plate | - | - |
| | Retardation plate (RA) | A-plate | Slow axis | 90° |
| | | OCB mode | Rubbing direction | 0° |
| | First compensation layer (CL1) | A-plate | Slow axis | 90° |
| | Retardation plate (RA) | | | |
| | Retardation plate (RC) | C-plate | - | - |
| | First retardation plate (R1) | λ/4 plate | Slow axis | 0° |
| | First polarizer plate (PL1) | | Absorption axis | 45° |

FIG. 10A

Comparative example
(transmissive part)
Without R2
Without R4

| | | Example of structure | | Modification | |
|---|---|---|---|---|---|
| Optical compensation element (70) | Polarizer plate (PL) | | Absorption axis 135° | | Absorption axis 135° |
| | Second retardation plate (R2) | λ/2 plate (biaxial) | Slow axis 45° | Nz= 0.15~0.3 | Slow axis 135° | Nz= 0.7~0.9 |
| | First retardation plate (R1) | λ/4 plate | Slow axis 90° | | Slow axis 90° |
| | Compensation layer (CL) | Retardation plate (RC) C-plate | — | | — |
| | | Retardation plate (RA) A-plate | Slow axis 90° | | Slow axis 90° |
| Liquid crystal display panel (1) | | OCB mode | Rubbing direction 0° | | Rubbing direction 0° |

F I G. 15

LIQUID CRYSTAL DISPLAY DEVICE WITH RETARDATION PLATES

CROSS-REFERENCE TO RELATED APPLICATIONS

This application is a continuation of and claims the benefit under 35 U.S.C. §120 from U.S. application Ser. No. 11/828,583, filed Jul. 26, 2007, which claims priority under 35 U.S.C. §119 from Japanese Patent Application Nos. 2006-203860, filed Jul. 26, 2006; and No. 2007-184426, filed Jul. 13, 2007, the entire contents of both of which are incorporated herein by reference.

BACKGROUND OF THE INVENTION

1. Field of the Invention

The present invention relates generally to a liquid crystal display device, and more particularly to a liquid crystal display device which uses an optically compensated bend (OCB) alignment technique that is capable of realizing a wide viewing angle and a high speed response.

2. Description of the Related Art

Liquid crystal display devices have been applied to various technical fields by virtue of their features of light weight, small thickness and low power consumption.

In recent years, attention has been paid to a liquid crystal display device to which an OCB mode is applied, as a liquid crystal display device that is capable of improving a viewing angle and a response speed. The OCB mode liquid crystal display device is configured such that a liquid crystal layer including bend-aligned liquid crystal molecules is held between a pair of substrates in the state in which a predetermined voltage is applied between the pair of substrates. Compared to a twisted nematic (TN) mode, the OCB mode can realize a higher response speed and can optically self-compensate the influence of birefringence of light that passes through the liquid crystal layer by the alignment state of liquid crystal molecules. Thus, the viewing angle can advantageously be increased.

There is disclosed a circular polarization plate that is applicable to the OCB mode liquid crystal display device (see, e.g. Jpn. Pat. Appln. KOKAI Publication No. 2005-164957). This circular polarization plate includes a liquid crystal film in which a nematic hybrid alignment structure is fixed.

As regards the above-described OCB mode liquid crystal display device, there has been a demand for a further increase in viewing angle at which a high contrast can be obtained.

BRIEF SUMMARY OF THE INVENTION

The object of the present invention is to provide a liquid crystal display device to which an OCB mode is applicable, and which is capable of increasing a viewing angle.

According to an aspect of the present invention, there is provided a liquid crystal display device comprising: an OCB mode liquid crystal display panel which is configured such that a liquid crystal layer is held between a first substrate and a second substrate; and an optical compensation element which is disposed outside of the liquid crystal layer and optically compensates a retardation of the liquid crystal layer in a predetermined display state in which a voltage is applied to the liquid crystal layer, wherein the optical compensation element includes: a polarizer plate; a first retardation plate which is disposed between the polarizer plate and the liquid crystal layer and imparts a phase difference of a ¼ wavelength; and a second retardation plate which is disposed between the polarizer plate and the first retardation plate and has a biaxial refractive index anisotropy, and the second retardation plate has a refractive index anisotropy which is set in such a manner as to compensate (a) a difference of a polarization state due to an influence of optical rotatory power that differs between azimuth directions of light passing through the liquid crystal layer and to compensate (b) a shift of the polarization state of light, which passes through the first retardation plate, from an azimuth direction of an absorption axis of the polarizer plate.

According to another aspect of the present invention, there may be provided a liquid crystal display device comprising: a liquid crystal display panel which is configured such that a liquid crystal layer is held between a first substrate and a second substrate, and to which an OCB mode is applied; and a first optical compensation element and a second optical compensation element which are disposed, respectively, on outer surfaces of the first substrate and the second substrate, and optically compensate a retardation of the liquid crystal layer in a predetermined display state in which a voltage is applied to the liquid crystal layer, wherein the first optical compensation element includes: a first polarizer plate; a first retardation plate which is disposed between the first polarizer plate and the liquid crystal display panel and imparts a phase difference of a ¼ wavelength between light components of a predetermined wavelength, which pass through a fast axis and a slow axis thereof; and a second retardation plate which is disposed between the first polarizer plate and the first retardation plate and has a biaxial refractive index anisotropy, and the second optical compensation element includes: a second polarizer plate; a third retardation plate which is disposed between the second polarizer plate and the liquid crystal display panel and imparts a phase difference of a ¼ wavelength between light components of a predetermined wavelength, which pass through a fast axis and a slow axis thereof; and a fourth retardation plate which is disposed between the second polarizer plate and the third retardation plate and has a biaxial refractive index anisotropy, and wherein the absorption axis of the first polarizer plate substantially agrees with an optical axis of the second retardation plate, the absorption axis of the second polarizer plate is substantially perpendicular to an optical axis of the fourth retardation plate, an Nz coefficient in the second retardation plate is set in a range of between 0.7 and 0.9, the Nz coefficient being given by $Nz=(nx-nz)/(nx-ny)$, where nx and ny are refractive indices in mutually perpendicular directions in a plane of the second retardation plate, and nz is a refractive index in a normal direction to the second retardation plate, and the Nz coefficient in the fourth retardation plate is set in a range of between 0.15 and 0.3.

According to still another aspect of the present invention, there may be provided a liquid crystal display device comprising: a liquid crystal display panel which is configured such that a liquid crystal layer is held between a first substrate and a second substrate, and to which an OCB mode is applied; and a first optical compensation element and a second optical compensation element which are disposed, respectively, on outer surfaces of the first substrate and the second substrate, and optically compensate a retardation of the liquid crystal layer in a predetermined display state in which a voltage is applied to the liquid crystal layer, wherein the first optical compensation element includes: a first polarizer plate; a first retardation plate which is disposed between the first polarizer plate and the liquid crystal display panel and imparts a phase difference of a ¼ wavelength between light components of a predetermined wavelength, which pass through a fast axis and a slow axis thereof; and a second retardation plate which is disposed between the first polarizer plate and the first retardation plate and has a biaxial refractive index anisotropy, and the second optical compensation element includes: a second polarizer plate; a third retardation plate which is disposed between the second polarizer plate and the liquid crystal display panel and imparts a phase difference of a ¼ wavelength between light components of a predetermined wavelength, which pass through a fast axis and a slow axis thereof; and a fourth retardation plate which is disposed between the second polarizer plate and the third retardation plate and has a biaxial refractive index anisotropy, and wherein the absorption axis of the first polarizer plate is substantially perpendicular to an optical axis of the second retardation plate, the absorption axis of the second polarizer plate substantially agrees with an optical axis of the fourth retardation plate, an Nz coefficient in the second retardation plate is set in a range of between 0.15 and 0.3, the Nz coefficient being given by $Nz=(nx-nz)/(nx-ny)$, where nx and ny are refractive indices in mutually perpendicular directions in a plane of the second retardation plate, and nz is a refractive index in a normal direction to the second retardation plate, and the Nz coefficient in the fourth retardation plate is set in a range of between 0.7 and 0.9.

According to still another aspect of the present invention, there may be provided a liquid crystal display device comprising: a liquid crystal display panel which is configured such that a liquid crystal layer is held between a first substrate and a second substrate, and to which an OCB mode is applied; and a first optical compensation element and a second optical compensation element which are disposed, respectively, on outer surfaces of the first substrate and the second substrate, and optically compensate a retardation of the liquid crystal layer in a predetermined display state in which a voltage is applied to the liquid crystal layer, wherein the first optical compensation element includes: a first polarizer plate; a first retardation plate which is disposed between the first polarizer plate and the liquid crystal display panel and imparts a phase difference of a ¼ wavelength between light components of a predetermined wavelength, which pass through a fast axis and a slow axis thereof; and a second retardation plate which is disposed between the first polarizer plate and the first retardation plate and has a biaxial refractive index anisotropy, and the second optical compensation element includes: a second polarizer plate; a third retardation plate which is disposed between the second polarizer plate and the liquid crystal display panel and imparts a phase difference of a ¼ wavelength between light components of a predetermined wavelength, which pass through a fast axis and a slow axis thereof; and a fourth retardation plate which is disposed between the second polarizer plate and the third retardation plate and has a biaxial refractive index anisotropy, and wherein the absorption axis of the first polarizer plate is substantially perpendicular to an optical axis of the second retardation plate, the absorption axis of the second polarizer plate is substantially perpendicular to an optical axis of the fourth retardation plate, and an Nz coefficient in each of the second retardation plate and the fourth retardation plate is set in a range of between 0.15 and 0.3, the Nz coefficient being given by $Nz=(nx-nz)/(nx-ny)$, where nx and ny are refractive indices in mutually perpendicular directions in a plane of each of the second retardation plate and the fourth retardation plate, and nz is a refractive index in a normal direction to each of the second retardation plate and the fourth retardation plate.

According to still another aspect of the present invention, there may be provided a liquid crystal display device comprising: a liquid crystal display panel which is configured such that a liquid crystal layer is held between a first substrate and a second substrate, and to which an OCB mode is applied; and a first optical compensation element and a second optical compensation element which are disposed, respectively, on outer surfaces of the first substrate and the second substrate, and optically compensate a retardation of the liquid crystal layer in a predetermined display state in which a voltage is applied to the liquid crystal layer, wherein the first optical compensation element includes: a first polarizer plate; a first retardation plate which is disposed between the first polarizer plate and the liquid crystal display panel and imparts a phase difference of a ¼ wavelength between light components of a predetermined wavelength, which pass through a fast axis and a slow axis thereof; and a second retardation plate which is disposed between the first polarizer plate and the first retardation plate and has a biaxial refractive index anisotropy, and the second optical compensation element includes: a second polarizer plate; a third retardation plate which is disposed between the second polarizer plate and the liquid crystal display panel and imparts a phase difference of a ¼ wavelength between light components of a predetermined wavelength, which pass through a fast axis and a slow axis thereof; and a fourth retardation plate which is disposed between the second polarizer plate and the third retardation plate and has a biaxial refractive index anisotropy, and wherein the absorption axis of the first polarizer plate substantially agrees with an optical axis of the second retardation plate, the absorption axis of the second polarizer plate substantially agrees with an optical axis of the fourth retardation plate, and an Nz coefficient in each of the second retardation plate and the fourth retardation plate is set in a range of between 0.7 and 0.9, the Nz coefficient being given by $Nz=(nx-nz)/(nx-ny)$, where nx and ny are refractive indices in mutually perpendicular directions in a plane of each of the second retardation plate and the fourth retardation plate, and nz is a refractive index in a normal direction to each of the second retardation plate and the fourth retardation plate.

The present invention can provide a liquid crystal display device to which an OCB mode is applicable, and which is capable of increasing a viewing angle.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4A schematically shows an example of the structure of an optical compensation element which is applicable to the liquid crystal display device shown in FIG. 1;

FIG. 4B schematically shows another example of the structure of the optical compensation element which is applicable to the liquid crystal display device shown in FIG. 1;

FIG. 4C schematically shows still another example of the structure of the optical compensation element which is applicable to the liquid crystal display device shown in FIG. 1;

FIG. 4D schematically shows still another example of the structure of the optical compensation element which is applicable to the liquid crystal display device shown in FIG. 1;

FIG. 7 is a view for explaining the structure of a transmissive liquid crystal display device or a transreflective liquid crystal display device to which a first optical compensation element and a second optical compensation element according to a first example of structure are applied;

FIG. 10A is a view for explaining the structure of a transmissive liquid crystal display device or a transreflective liquid crystal display device to which a first optical compensation element and a second optical compensation element according to a second example of structure are applied;

FIG. 15 is a view for explaining an example of structure and an example of modification of a reflective liquid crystal display device;

DETAILED DESCRIPTION OF THE INVENTION

Liquid crystal display devices according to an embodiment of the present invention will now be described with reference to the accompanying drawings. Liquid crystal display devices, to which an OCB mode is applied, will be described as examples of the liquid crystal display devices. Such OCB mode liquid crystal display devices include a transmissive liquid crystal display device in which each pixel is composed of only a transmissive part that displays an image by selectively passing backlight; a reflective liquid crystal display device in which each pixel is composed of only a reflective part that displays an image by selectively reflecting ambient light; and a transreflective liquid crystal display device in which each pixel is composed of both the reflective part and the transmissive part.

《Transmissive Liquid Crystal Display Device》

Figure 1:
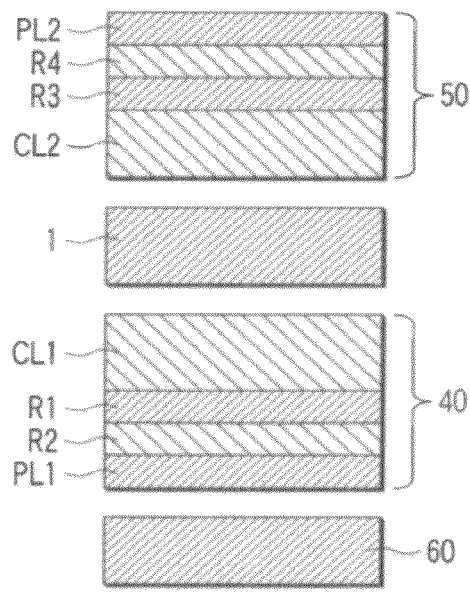
FIG. 1 schematically shows the structure of a transmissive liquid crystal display device or a transreflective liquid crystal display device according to an embodiment of the present invention.

As shown in FIG. 1, a transmissive liquid crystal display device includes a liquid crystal display panel 1 to which an OCB mode is applied, a backlight 60 which illuminates the liquid crystal display panel 1, a first optical compensation element 40 which is disposed between the liquid crystal display panel 1 and the backlight 60, and a second optical compensation element 50 which is disposed on an observation surface side of the liquid crystal display panel 1.

Figure 2:
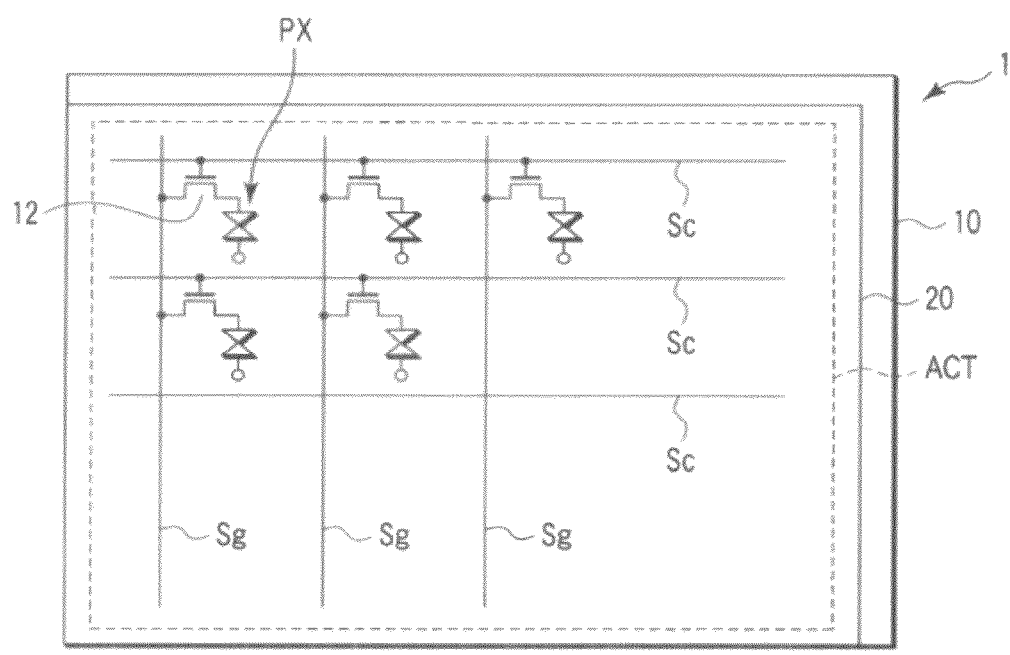
FIG. 2 schematically shows the structure of a liquid crystal display panel which is applicable to the liquid crystal display device shown in FIG. 1.
Figure 3:
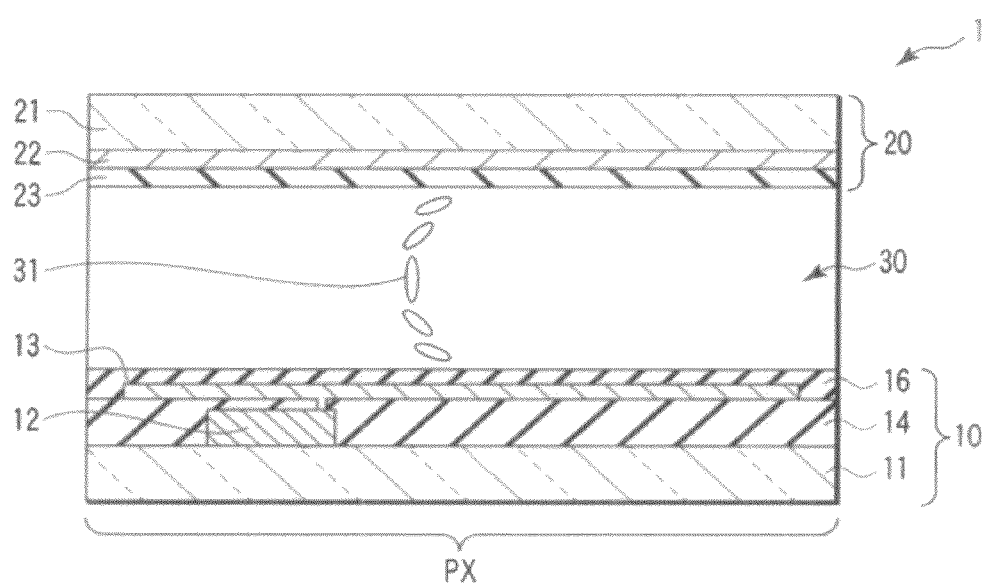
FIG. 3 schematically shows the structure of an OCB mode transmissive liquid crystal display panel which is applicable to the liquid crystal display device shown in FIG. 1.

As shown in FIG. 2 and FIG. 3, the liquid crystal display panel 1 is configured such that a liquid crystal layer 30 is held between a pair of substrates, namely, an array substrate (first substrate) 10 and a counter-substrate (second substrate) 20. The liquid crystal display panel 1 includes an active area ACT which displays an image. This active area ACT is composed of a plurality of pixels PX which are arrayed in a matrix.

The array substrate 10 is formed by using a light-transmissive insulating substrate 11 such as a glass substrate. The array substrate 10 includes, on one major surface of the insulating substrate 11, a plurality of scanning lines Sc which are disposed along rows of pixels PX; a plurality of signal lines Sg which are disposed along columns of pixels PX; switch elements 12 which are disposed near intersections between the scanning lines Sc and signal lines Sg in association with the individual pixels PX; pixel electrodes 13 which are disposed in association with the individual pixels PX and are connected to the associated switch elements 12; and an alignment film 16 which is disposed so as to cover the entire major surface of the insulating substrate 13.

Each of the switch elements 12 is composed of, e.g. a thin-film transistor (TFT). The switch element 12 has a gate connected to the associated scanning line Sc. The switch element 12 has a source connected to the associated signal line Sg. The pixel electrode 13 is disposed on an insulation film 14, and is electrically connected to the drain of the switch element 12. The pixel electrode 13 functions as a transmissive electrode and is formed of a light-transmissive electrically conductive material such as indium tin oxide (ITO). In short, each pixel PX corresponds to a transmissive part.

The counter-substrate 20 is formed by using a light-transmissive insulating substrate 21 such as a glass substrate. The counter-substrate 20 includes, on one major surface of the insulating substrate 21, a counter-electrode 22 which is disposed commonly for the plural pixels PX, and an alignment film 23 which is disposed so as to cover the entire major surface of the insulating substrate 21. The counter-electrode 22 is formed of a light-transmissive electrically conductive material such as ITO.

The array substrate 10 and counter-substrate 20 having the above-described structures are disposed with a predetermined gap provided therebetween by spacers (not shown), and are attached to each other by a seal material. The liquid crystal layer 30 is sealed in the gap between the array substrate 10 and counter-substrate 20.

In this embodiment, the OCB mode is applied to the liquid crystal display panel 1 not only in the example of the transmissive liquid crystal display device, but also in examples of the transreflective liquid crystal display device and reflective liquid crystal display device, which will be described later. The liquid crystal layer 30 is formed of a material including liquid crystal molecules 31 which have positive dielectric constant anisotropy and optically positive uniaxiality. In this liquid crystal layer 30, as shown in FIG. 3, the liquid crystal molecules 31 are bend-aligned between the array substrate 10 and counter-substrate 20 in a predetermined display state in which a voltage is applied to the liquid crystal layer 30.

《First Example of Structure of the Optical Compensation Element》

In a first example of structure, the first optical compensation element 40 and second optical compensation element 50 have functions of optically compensating retardation of the liquid crystal layer 30 in a predetermined display state in which a voltage is applied to the liquid crystal layer 30 in the above-described liquid crystal display panel 1. Specifically, as shown in FIG. 1, the first optical compensation element 40 is disposed on the outside surface of the array substrate 10, and the second optical compensation element 50 is disposed on the outside surface of the counter-substrate 20. The first optical compensation element 40 and second optical compensation element 50 have substantially the same structure and are configured to be symmetric with respect to the liquid crystal display panel 1.

Specifically, the first optical compensation element 40 includes a first polarizer plate PL1, a first retardation plate R1 and a second retardation plate R2. The second optical compensation element 50 includes a second polarizer plate PL1, a third retardation plate R3 and a fourth retardation plate R4.

Each of the first polarizer plate PL1 and second polarizer plate PL2 is configured such that a polarization layer of, e.g. polyvinyl alcohol (PVA) is held between a pair of support layers of, e.g. triacetate cellulose (TAC). Each of the first polarizer plate PL1 and second polarizer plate PL2 has a transmission axis and an absorption axis which are substantially perpendicular to each other.

The first retardation plate R1 is disposed between the first polarizer plate PL1 and the liquid crystal display panel 1. The third retardation plate R3 is disposed between the second polarizer plate PL2 and the liquid crystal display panel 1. Each of the first retardation plate R1 and the third retardation plate R3 has, in a plane thereof, a fast axis and a slow axis which are substantially perpendicular to each other. Each of the first retardation plate R1 and the third retardation plate R3 is a so-called "¼ wavelength plate", which imparts a phase difference of a ¼ wavelength between light components of a predetermined wavelength, which pass through the fast axis and the slow axis.

Each of the combination of the first polarizer plate PL1 and first retardation plate (¼ wavelength plate) R1 and the combination of the second polarizer plate PL2 and third retardation plate (¼ wavelength plate) R3 ideally functions as a circular polarization element that converts linearly polarized light of a predetermined wavelength, which has passed through the transmission axis of the polarizer plate, to circularly polarized light.

The second retardation plate R2 is disposed between the first polarizer plate PL1 and the first retardation plate R1. The fourth retardation plate R4 is disposed between the second polarizer plate PL2 and the third retardation plate R3. Each of the second retardation plate R2 and the fourth retardation plate R4 is a retardation plate having biaxial refractive index anisotropy, and has, in a plane thereof, a fast axis and a slow axis which are substantially perpendicular to each other. Each of the second retardation plate R2 and the fourth retardation plate R4 is a so-called "½ wavelength plate", which imparts a phase difference of a ½ wavelength between light components of a predetermined wavelength, which pass through the fast axis and the slow axis. The details of the second retardation plate R2 and the fourth retardation plate R4 will be described later.

Each of the first optical compensation element 40 and second optical compensation element 50 includes a compensation layer CL. Specifically, the first optical compensation element 40 includes a first compensation layer CL1 which is disposed between the liquid crystal display panel 1 and first retardation plate R1. The second optical compensation element 50 includes a second compensation layer CL2 which is disposed between the liquid crystal display panel 1 and third retardation plate R3.

The structures of the first optical compensation element 40 and second optical compensation element 50, which include the first compensation layer CL1 and second compensation layer CL2, will now be described specifically. Examples of the structure of the first optical compensation element 40 are described with reference to FIG. 4A to FIG. 4D. The same examples of the structure are also applicable to the second optical compensation element 50. The first compensation layer CL1 and second compensation layer CL2 may not necessarily have the same structure.

In an example of structure shown in FIG. 4A, the first compensation layer CL1 includes a retardation plate RA which is disposed between the liquid crystal display panel 1 and the first retardation plate R1 and has a refractive index anisotropy which substantially corresponds to an A-plate, and a retardation plate RC which is disposed between the first retardation plate R1 and the retardation plate RA and has a refractive index anisotropy which substantially corresponds to a C-plate.

The retardation plate RA has such an in-plane phase difference as to cancel a residual retardation in the plane thereof in a specified voltage application state (e.g. a state in which black is displayed by applying a high voltage). Specifically, the retardation plate RA has a refractive index anisotropy of nx>ny≅nz or nz≅nx>ny, where nx and ny are refractive indices in mutually perpendicular directions in the plane of the retardation plate RA, and nz is a refractive index in a normal direction to the retardation plate RA. By the function of the retardation plate RA, the in-plane phase difference of the liquid crystal layer 30 can be canceled, and a display quality at a time of observation in a frontal direction of the screen (a normal direction to the screen) can be improved (in particular, contrast can be improved).

The retardation plate RC has such a normal-directional phase difference as to cancel a residual retardation in the normal direction thereof in a specified voltage application state (e.g. a state in which black is displayed by applying a high voltage). Specifically, the retardation plate RC has a refractive index anisotropy of $nx \cong ny \neq nz$. By the function of the retardation plate RC, the normal-directional phase difference of the liquid crystal layer 30 can be canceled, and a display quality at a time of observation in an oblique direction of the screen can be improved (in particular, a viewing angle can be improved).

In an example of structure shown in FIG. 4B, the first compensation layer CL1 includes a retardation plate RB which has a biaxial refractive index anisotropy and is disposed between the liquid crystal display panel 1 and the first retardation plate R1. This retardation plate RB has both a refractive index anisotropy which substantially corresponds to an A-plate and a refractive index anisotropy which substantially corresponds to a C-plate. To be more specific, the retardation plate RB has a refractive index anisotropy of $nx > ny > nz$. In this example of structure, the same advantageous effects as in the example of structure shown in FIG. 4A can be obtained. Moreover, since the number of retardation plates is less than in the example of structure shown in FIG. 4A, the reduction in thickness can be achieved.

In an example of structure shown in FIG. 4C, the first compensation layer CL1 includes a retardation plate Rwv which is disposed between the liquid crystal display panel 1 and the first retardation plate R1. This retardation plate Rwv is an anisotropic film which compensates retardation of the liquid crystal layer 30. The retardation plate Rwv is an anisotropic film having such a refractive index anisotropy that a substantial major axis is inclined to the normal line, when consideration is given to the total refractive index anisotropy of the retardation plate Rwv itself. As such a retardation plate Rwv, a WV (Wide View) film (manufactured by FUJIFILM Corporation) is applicable. The WV film is a liquid crystal film in which discotic liquid crystal molecules having an optically negative uniaxial refractive index anisotropy are fixed in the state in which an optical axis is hybrid-aligned along the normal direction in a liquid crystal state (i.e. in the state in which the major axis is hybrid-aligned).

Figure 5:
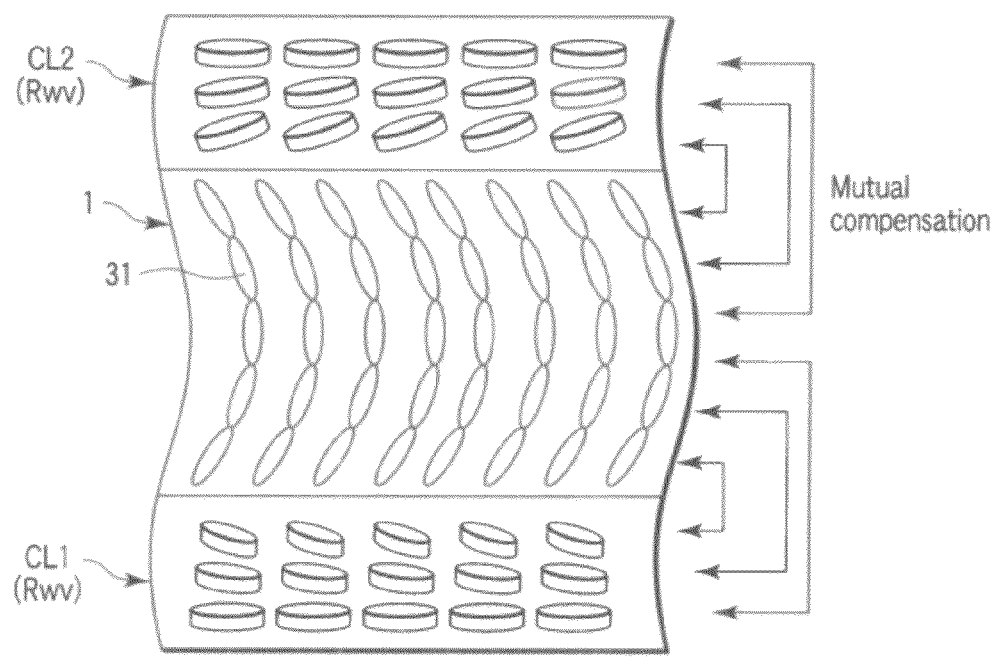
FIG. 5 is a view for explaining a relationship of compensation with liquid crystal molecules in a case where the optical compensation element shown in FIG. 4C is applied.

In particular, in the case where both the first compensation layer CL1 and second compensation layer CL2 are composed of retardation plates Rwv in relation to the OCB mode liquid crystal display panel 1, the discotic liquid crystal molecules which constitute the retardation plates Rwv, as shown in FIG. 5, optically compensate the bend-aligned liquid crystal molecules 31, respectively. Therefore, the combination of the OCB mode liquid crystal display panel 1 and the retardation plates Rwv is effective in terms of optical compensation.

In an example of structure shown in FIG. 4D, the first compensation layer CL1 includes a retardation plate RA which is disposed between the liquid crystal display panel 1 and the first retardation plate R1 and has a refractive index anisotropy which substantially corresponds to an A-plate. In this case, a retardation plate having biaxial refractive index anisotropy is applied to the first retardation plate R1. Specifically, the refractive index anisotropy of the first retardation plate R1 is set to have a refractive index anisotropy substantially corresponding to a C-plate, in addition to its own function as a ¼ wavelength plate. To be more specific, the first retardation plate R1 has a refractive index anisotropy of $nx > ny > nz$. In this example of structure, the same advantageous effects as in the example of structure shown in FIG. 4A can be obtained. Moreover, since the number of retardation plates is less than in the example of structure shown in FIG. 4A, the reduction in thickness can be achieved.

In the above-described liquid crystal display device, the respective structural elements are arranged with axial angles described below, in relation to a reference direction that is the rubbing direction of the alignment film 16 on the array substrate 10 side and the alignment film 23 on the counter-substrate 20 side. The axial angle, in this context, refers to a counterclockwise angle, relative to the reference azimuth direction (X axis), of the absorption axis of the polarizer plate and the slow axis (or optical axis) of the retardation plate, as defined in FIG. 6. Specifically, when the liquid crystal display device is observed from the counter-substrate 20 side, an X axis and a Y axis, which are perpendicular to each other, are defined, for the purpose of convenience, in a plane that is parallel to the major surface of the array substrate 10 (or counter-substrate 20), and a normal direction to this plane is defined as a Z axis. The term "in-plane" means "within a plane" that is defined by the X axis and Y axis.

A description is given of the case in which the first compensation layer CL1 and second compensation layer CL2 in the first optical compensation element 40 and second optical compensation element 50 according to the first example of structure are composed of the retardation plate RA and retardation plate RC as shown in FIG. 4A.

Specifically, in the liquid crystal display panel 1, the rubbing direction is set at 0° azimuth. In the first optical compensation element 40, the absorption axis of the first polarizer plate PL1 is set at 45° azimuth. The slow axis of the first retardation plate R1 is set at 0° azimuth (i.e. crossing the absorption axis of the first polarizer plate PL1 at about 45°). The optical axis of the second retardation plate R2 in the X-Y plane is set at 45° azimuth (i.e. substantially parallel to the absorption axis of the first polarizer plate PL1). The slow axis of the retardation plate RA is set at 90° azimuth.

In the second optical compensation element 50, the absorption axis of the second polarizer plate PL2 is set at 135° azimuth. The slow axis of the third retardation plate R3 is set at 90° azimuth (i.e. crossing the absorption axis of the second polarizer plate PL2 at about 45°). The optical axis of the fourth retardation plate R4 in the X-Y plane is set at 45° azimuth (i.e. substantially perpendicular to the absorption axis of the polarizer plate PL). The slow axis of the retardation plate RA is set at 90° azimuth.

The above-described axial angles of the respective structural elements are summarized in FIG. 7.

Figure 6:
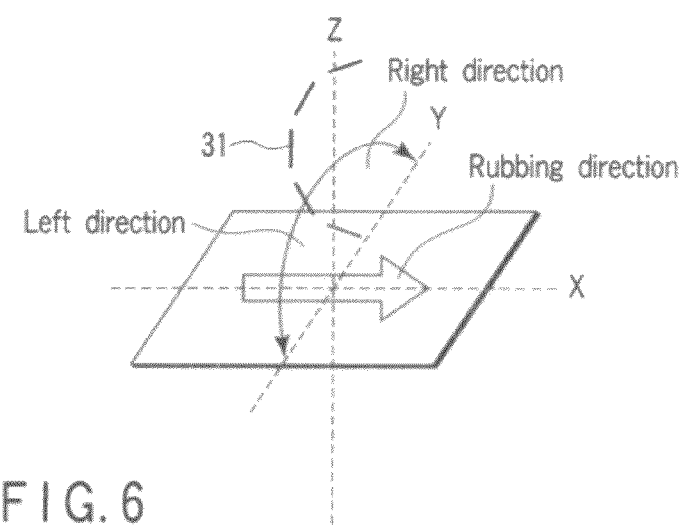
FIG. 6 is a view for explaining the definitions of axial angles relative to a rubbing direction of an alignment film in the liquid crystal display device shown in FIG. 1.

In the liquid crystal display device that adopts the OCB mode, the liquid crystal molecules 31 are bend-aligned, as shown in FIG. 6, in a predetermined voltage application state (e.g. black display state) in an X-Z plane. When the screen is observed from a direction at 90° azimuth in the X-Y plane, the liquid crystal molecules 31 are aligned counterclockwise from the lower side (array substrate side) to the upper side (counter-substrate side). On the other hand, when the screen is observed from a direction at 270° azimuth in the X-Y plane, the liquid crystal molecules 31 are aligned clockwise from the lower side to the upper side.

Thus, the optical rotatory power of the light that passes through the liquid crystal layer 30 is affected by the alignment of liquid crystal molecules 31 in opposite rotational directions at 90° azimuth and 270° azimuth. Owing to the influence of asymmetry of optical rotatory power, the polarization states of light, which passes through the liquid crystal layer 30 toward the respective azimuth directions, are different. In other words, a difference occurs in the display quality of the screen due to the difference in polarization state of light passing through the liquid crystal layer 30, between the case where the viewing angle is increased from the normal direction (i.e. Z-axis direction) of the screen toward the 90° azimuth in the X-Y plane and the case where the viewing angle is increased from the normal direction of the screen toward the 270° azimuth in the X-Y plane. Hence, the viewing angle at which a high contrast is obtained is limited.

In the present embodiment, the difference of the polarization state, which varies depending on the influence of optical rotatory power that differs between azimuth directions of light passing through the liquid crystal layer 30, is optically compensated.

Moreover, in the predetermined voltage application state (black display state), the polarization state (ideally a linear polarization state) of light, which emerges from the third retardation plate R3 of the second optical compensation element 50, shifts from the azimuth direction of the absorption axis of the second polarizer plate PL2, due to the influence of retardation of not only the liquid crystal layer 30 but also other structural elements. Consequently, the transmittance of the screen at the time of black display cannot sufficiently be lowered, and the contrast may deteriorate. To solve this problem, use is made of the optical compensation elements having the function of optically compensating the shift of the polarization state of light, which passes through the third retardation plate R3, from the azimuth direction of the absorption axis of the second polarizer plate PL2. Thereby, the contrast can be improved, and the viewing angle at which a high contrast is obtained, can be increased.

A more detailed description is given below.

In the case where the first optical compensation element 40 and second optical compensation element 50 according to the first example of structure are applied to the transmissive liquid crystal display, the first optical compensation element 40 includes, as shown in FIG. 1, the second retardation plate R2 with the biaxial refractive index anisotropy between the first retardation plate R1 and the first polarizer plate PL1. In addition, the second optical compensation element 50 includes the fourth retardation plate R4 with the biaxial refractive index anisotropy between the third retardation plate R3 and the second polarizer plate PL2. The inventor has found that the above-described optical compensation can be achieved by optimizing an Nz coefficient, which is given by $Nz=(nx-nz)/(nx-ny)$, in the second retardation plate R2 and fourth retardation plate R4 each having the biaxial refractive index anisotropy.

In particular, in specifying the optimal range of the Nz coefficient, it was verified that the influence of different optical rotatory power and the influence of the shift of the polarization state from the azimuth direction of the absorption axis can be improved by varying the Nz coefficient.

In the structure shown in FIG. 1, the second retardation plate R2 of the first optical compensation element 40 mainly compensates the difference of the polarization state which varies mainly due to the influence of optical rotatory power, depending on the azimuth direction of light passing through the liquid crystal layer 30. The fourth retardation plate R4 of the second optical compensation element 50 mainly compensates the shift of the polarization state of the light, which has passed through the third retardation plate R3, from the azimuth direction of the absorption axis of the second polarizer plate PL2.

In the above-described structure, the Nz coefficient that is necessary for each compensation differs, and the Nz coefficient of the second retardation plate R2 of the first optical compensation element 40 differs from the Nz coefficient of the fourth retardation plate R4 of the second optical compensation element 50. Specifically, in order to compensate the difference of the polarization state which varies depending on the azimuth direction of light passing through the liquid crystal layer 30, it is desirable to use the second retardation plate R2 having the Nz coefficient that is set in the range of between 0.7 and 0.9. If the Nz coefficient is less than 0.7 or greater than 0.9, it is difficult to secure a viewing angle contrast at, e.g. 90° azimuth.

On the other hand, in order to compensate the shift of the polarization state of the light, which has passed through the third retardation plate R3, from the azimuth direction of the absorption axis of the second polarizer plate PL2, it is desirable to use the fourth retardation plate R4 having the Nz coefficient that is set in the range of between 0.15 and 0.3. If the Nz coefficient is less than 0.15 or greater than 0.3, the compensation of the polarization state would become deficient and it is difficult to secure the viewing angle contrast.

Thereby, a sufficiently wide viewing angle can be obtained, and a good display quality can be obtained.

Next, verification was conducted on the advantageous effects that are obtained in the case where the first optical compensation element 40 and second optical compensation element 50 according to the first example of structure are applied to the transmissive liquid crystal display. The structure of the transmissive liquid crystal display device according to the present embodiment is as shown in FIG. 1. The Nz coefficient of the second retardation plate R2 of the first optical compensation element 40 was set at 0.9 ($nx=1.580951$, $ny=1.578995$, $nz=1.579191$), and the Nz coefficient of the fourth retardation plate R4 of the second optical compensation element 50 was set at 0.2 ($nx=1.580951$, $ny=1.578995$, $nz=1.580560$). In a comparative example, a first optical compensation element 40 including no second retardation plate and a second optical compensation element 50 including no fourth retardation plate were applied to a liquid crystal display device, with the other structural aspects being the same as in the present embodiment.

Figure 8A:
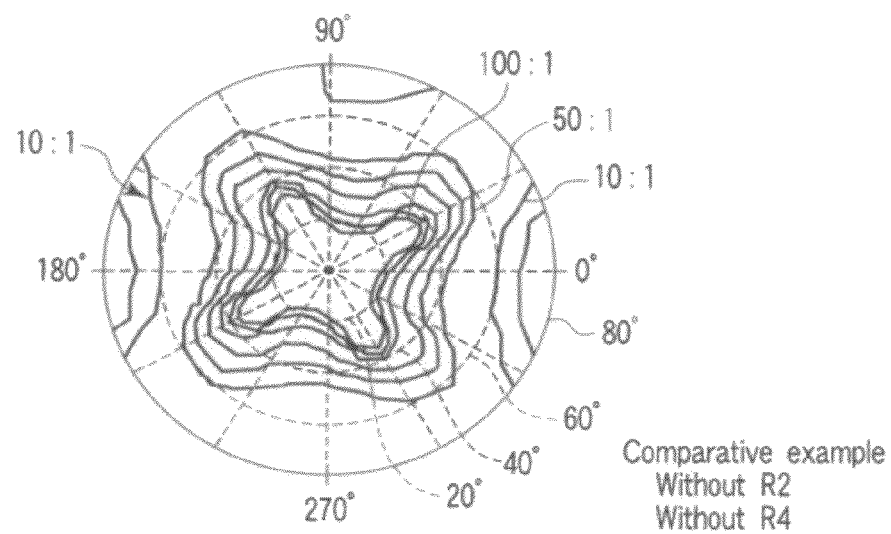
FIG. 8A shows a result of simulation of a viewing angle dependency of a contrast ratio in a transmissive liquid crystal display device according to a comparative example.

FIG. 8A shows a result of simulation of the viewing angle dependency of a contrast ratio in the liquid crystal display device according to the comparative example. In FIG. 8A, the center corresponds to the normal direction (Z axis) of the liquid crystal display panel. Concentric circles defined about the normal direction indicate tilt angles (viewing angles) to the normal direction, and correspond to 20°, 40°, 60° and 80°, respectively. The characteristic diagram of FIG. 8A was obtained by connecting regions corresponding to contrast ratios (CR) of 100:1 to 10:1 in all azimuth directions.

As shown in FIG. 8A, it is understood that in the liquid crystal display device of the comparative example, the contrast ratio becomes 10:1 or less in the range of viewing angles of 60° or more, in particular, at 0° azimuth and 180° azimuth. For the purpose of convenience, assume that the azimuth direction parallel to the rubbing direction (0°-180° azimuth) is the vertical direction of the screen, the 90° azimuth direction is the right direction of the screen, and the 270° azimuth direction is the left direction of the screen. In this case, it was confirmed that the contrast ratio considerably lowers as the viewing angle increases from the normal direction toward the upward and downward directions of the screen.

Figure 8B:
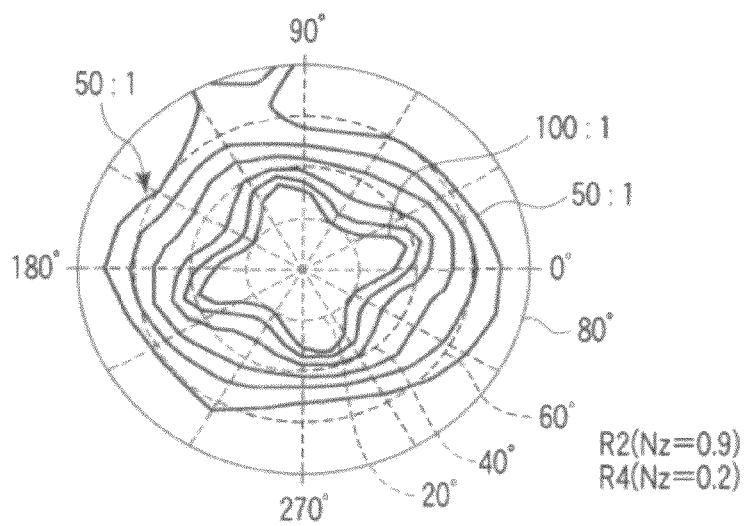
FIG. 8B shows a result of simulation of a viewing angle dependency of a contrast ratio in the transmissive liquid crystal display device according to the present embodiment.

FIG. 8B shows a result of simulation of the viewing angle dependency of a contrast ratio in the liquid crystal display device according to the present embodiment. As is clear from FIG. 8B, it was confirmed that the contrast ratio of 10:1 or more was obtained in the range of viewing angles of 80° or more in all azimuth directions, and sufficient viewing angles were obtained.

The same advantageous effects were confirmed as regards another structure of the transmissive liquid crystal display device according to the present embodiment, wherein the Nz coefficient of the second retardation plate R2 of the first optical compensation element 40 was set at 0.8 (nx=1.580951, ny=1.578995, nz=1.579386), and the Nz coefficient of the fourth retardation plate R4 of the second optical compensation element 50 was set at 0.15 (nx=1.580951, ny=1.578995, nz=1.580658).

Moreover, the same advantageous effects were confirmed as regards still another structure of the transmissive liquid crystal display device according to the present embodiment, wherein the Nz coefficient of the second retardation plate R2 of the first optical compensation element 40 was set at 0.7 (nx=1.580951, ny=1.578995, nz=1.579582), and the Nz coefficient of the fourth retardation plate R4 of the second optical compensation element 50 was set at 0.3 (nx=1.580951, ny=1.578995, nz=1.580364).

However, in the case where the Nz coefficient of the second retardation plate R2 of the first optical compensation element 40 was set at 0.5 (nx=1.580951, ny=1.578995, nz=1.579973), the influence of undesired optical rotatory power could not be compensated and a high viewing angle contrast failed to be secured. Similarly, in the case where the Nz coefficient of the second retardation plate R2 of the first optical compensation element 40 was set at 1.1 (nx=1.580951, ny=1.578995, nz=1.58799), the influence of undesired optical rotatory power could not be compensated and a high viewing angle contrast failed to be secured.

As shown in FIG. 7, in the first example of structure, the absorption axis of the first polarizer plate PL1 and the optical axis of the second retardation plate R2 substantially agree in the first optical compensation element 40. In addition, in the second optical compensation element 50, the absorption axis of the second polarizer plate PL2 is substantially perpendicular to the optical axis of the fourth retardation plate R4. The invention, however, is not limited to this example. Specifically, since the first optical compensation element 40 and second optical compensation element 50 are symmetric in the liquid crystal display panel 1, the first optical compensation element 40 and second optical compensation element 50 may substantially be transposed in an alternative structure.

To be more specific, in Modification 1, the optical axis of the second retardation plate R2 in its X-Y plane is set at 135° in the first optical compensation element 40. In short, the absorption axis of the first polarizer plate PL1 is substantially perpendicular to the optical axis of the second retardation plate R2. In addition, in the second optical compensation element 50, the optical axis of the fourth retardation plate R4 in its X-Y plane is set at 135°. In short, the absorption axis of the second polarizer plate PL2 substantially agrees with the optical axis of the fourth retardation plate R4. In this Modification 1, the same advantageous effects as in the above-described first example of structure can be obtained by making use of the fourth retardation plate R4 in which the Nz coefficient is set in the range of between 0.7 and 0.9, and the second retardation plate R2 in which the Nz coefficient is set in the range of between 0.15 and 0.3.

For example, it was confirmed that a sufficient viewing angle was obtained in the case where the Nz coefficient in the second retardation plate R2 of the first optical compensation element 40 was set at 0.2 and the Nz coefficient in the fourth retardation plate R4 of the second optical compensation element 50 was set at 0.8.

In the first example of structure, in the case where the absorption axis of the first polarizer plate PL1 substantially agrees with the optical axis of the second retardation plate R2 in the first optical compensation element 40 and the absorption axis of the second polarizer plate PL2 substantially agrees with the optical axis of the fourth retardation plate R4 in the second optical compensation element 50, it should suffice to use the second retardation plate R2 and fourth retardation plate R4, in each of which the Nz coefficient is set in the range of between 0.7 and 0.9. Similarly, in the case where the absorption axis of the first polarizer plate PL1 is substantially perpendicular to the optical axis of the second retardation plate R2 in the first optical compensation element 40 and the absorption axis of the second polarizer plate PL2 is substantially perpendicular to the optical axis of the fourth retardation plate R4 in the second optical compensation element 50, it should suffice to use the second retardation plate R2 and fourth retardation plate R4, in each of which the Nz coefficient is set in the range of between 0.15 and 0.3. In each of these cases, the same advantageous effects as in the above-described first example of structure can be obtained, and the common structural elements are usable and the reduction in cost is realized.

≪Second Example of the Structure of the Optical Compensation Element≫

In a second example of structure, like the above-described first example of structure, the first optical compensation element 40 and second optical compensation element 50 have functions of optically compensating retardation of the liquid crystal layer 30 in a predetermined display state in which a voltage is applied to the liquid crystal layer 30 of the liquid crystal display panel 1.

Figure 9A:
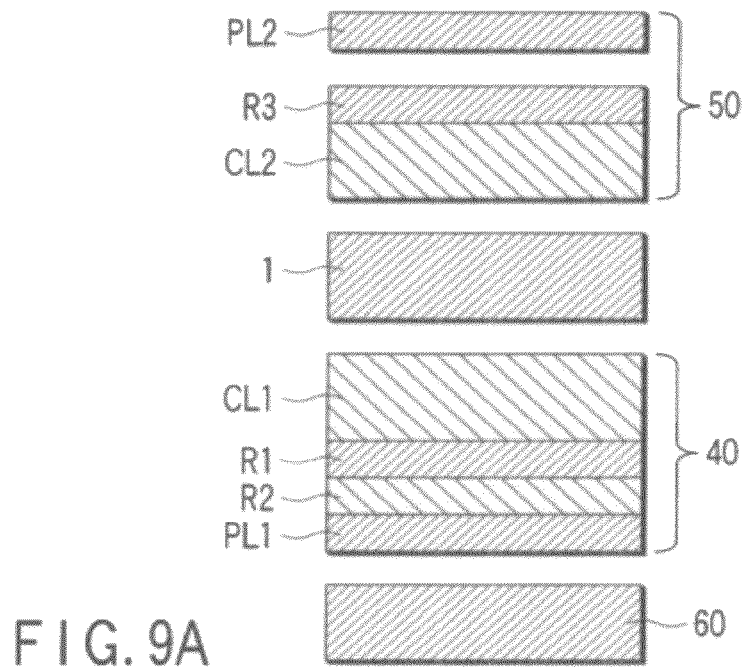
FIG. 9A schematically shows another structure of a transmissive liquid crystal display device or a transreflective liquid crystal display device according to an embodiment of the present invention.

Specifically, as shown in FIG. 9A, the first optical compensation element 40, which is disposed on the outer surface of the array substrate 10, is configured to include a first polarizer plate PL1, a first retardation plate R1 and a second retardation plate R2. The second optical compensation element 50, which is disposed on the outer surface of the counter-substrate 20, is configured to include a second polarizer plate PL2 and a third retardation plate R3. The first optical compensation element 40 and the second optical compensation element 50 are configured to be asymmetric with respect to the liquid crystal display panel 1. According to the liquid crystal display device to which the optical compensation elements according to the second example of structure are applied, the number of retardation plates is less than in the liquid crystal display device to which the optical compensation elements according to the first example of structure are applied. Therefore, the reduction in cost and thickness can be achieved.

The first polarizer plate PL1, second polarizer plate PL2, the first retardation plate R1 and the third retardation plate R3 are the same as those in the first example of structure. Specifically, each of the combination of the first polarizer plate PL1 and the first retardation plate (¼ wavelength plate) R1 and the combination of the second polarizer plate PL2 and the third retardation plate (¼ wavelength plate) R3 functions ideally as a circular polarization element that converts linearly polarized light of a predetermined wavelength, which has passed through the transmission axis of the polarizer plate, to circularly polarized light.

The second retardation plate R2 is disposed between the first polarizer plate PL1 and the first retardation plate R1. The second retardation plate R2 is a retardation plate with a biaxial refractive index anisotropy.

The first optical compensation element 40 includes a first compensation layer CL1 which is disposed between the liquid crystal display panel 1 and the first retardation plate R1. The second optical compensation element 50 includes a second compensation layer CL2 which is disposed between the liquid crystal display panel 1 and the third retardation plate R3. Like the first example of structure, the structures as shown in FIG. 4A to FIG. 4D are applicable to the first optical compensation element 40 and the second optical compensation element 50, which include the first compensation layer CL1 and the second compensation layer CL2, respectively.

A description is given of the case in which the first compensation layer CL1 and second compensation layer CL2 in the first optical compensation element 40 and second optical compensation element 50 according to the second example of structure are composed of the retardation plate RA and retardation plate RC as shown in FIG. 4A.

Specifically, in the liquid crystal display panel 1, the rubbing direction is set at 0° azimuth. In the first optical compensation element 40, the absorption axis of the first polarizer plate PL1 is set at 45° azimuth. The slow axis of the first retardation plate R1 is set at 0° azimuth (i.e. crossing the absorption axis of the first polarizer plate PL1 at about 45°). The optical axis of the second retardation plate R2 in the X-Y plane is set at 45° azimuth (i.e. substantially parallel to the absorption axis of the first polarizer plate PL1). The slow axis of the retardation plate RA is set at 90° azimuth.

In the second optical compensation element 50, the absorption axis of the second polarizer plate PL2 is set at 135° azimuth. The slow axis of the third retardation plate R3 is set at 90° azimuth (i.e. crossing the absorption axis of the second polarizer plate PL2 at about 45°). The slow axis of the retardation plate RA is set at 90° azimuth.

The above-described axial angles of the respective structural elements are summarized in FIG. 10A.

In the second example of structure, like the first example of structure, use is made of the optical compensation elements having the function of optically compensating the difference of the polarization state, which varies depending on the influence of optical rotatory power that differs between azimuth directions of light passing through the liquid crystal layer 30, and also optically compensating the shift of the polarization state of light, which passes through the third retardation plate R3, from the azimuth direction of the absorption axis of the second polarizer plate PL2. Thereby, the contrast can be improved, and the viewing angle at which a high contrast is obtained can be increased.

A more detailed description is given below.

In the case where the first optical compensation element 40 and second optical compensation element 50 according to the second example of structure are applied to the transmissive liquid crystal display, the first optical compensation element 40 includes, as shown in FIG. 9A, the second retardation plate R2 with the biaxial refractive index anisotropy between the first retardation plate R1 and the first polarizer plate PL1. In the structure shown in FIG. 9A, the second retardation plate R2 of the first optical compensation element 40 has the function of compensating the difference of the polarization state which varies due to the influence of optical rotatory power, depending on the azimuth direction of light passing through the liquid crystal layer 30, and compensating the shift of the polarization state of the light, which has passed through the third retardation plate R3, from the azimuth direction of the absorption axis of the second polarizer plate PL2.

In the above-described structure, it is desirable to use the second retardation plate R2 having the Nz coefficient that is set in the range of between 0.4 and 0.6. If the Nz coefficient is less than 0.4 or greater than 0.6, the optical compensation becomes deficient and it is difficult to secure the viewing angle contrast.

Thereby, a sufficiently wide viewing angle can be obtained, and a good display quality can be obtained.

Figure 10B:
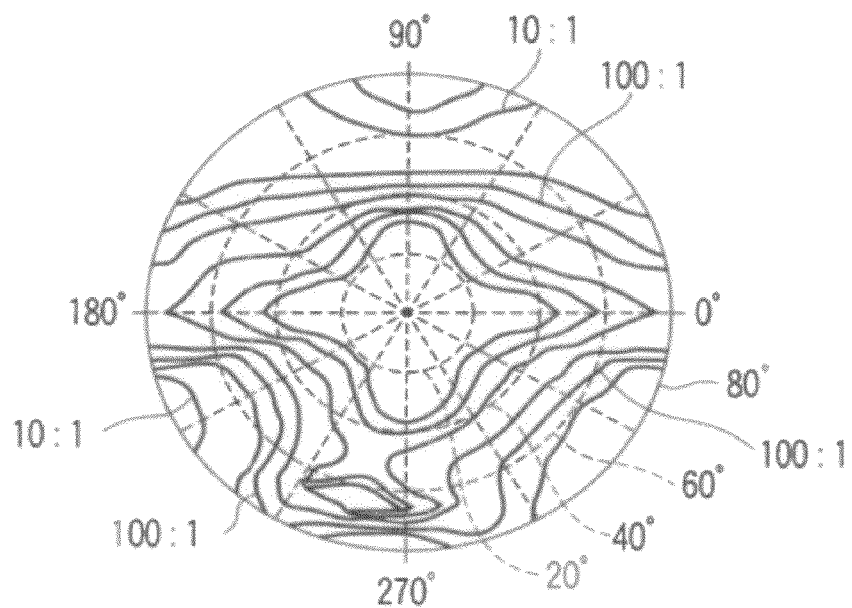
FIG. 10B shows a result of simulation of a viewing angle dependency of a contrast ratio in the transmissive liquid crystal display device according to the present embodiment.

Next, verification was conducted on the advantageous effects that are obtained in the case where the first optical compensation element 40 and second optical compensation element 50 according to the second example of structure are applied to the transmissive liquid crystal display. The structure of the transmissive liquid crystal display device according to the present embodiment is as shown in FIG. 9A. The Nz coefficient of the second retardation plate R2 of the first optical compensation element 40 was set at 0.5 (nx=1.580951, ny=1.578995, nz=1.579973). The viewing angle dependency of the contrast ratio in the liquid crystal display device according to the present embodiment was simulated, and it was confirmed, as shown in FIG. 10B, that the contrast ratio of 10:1 or more was obtained in the range of viewing angles of 60° or more in all azimuth directions of the screen, and the contrast ratio of 10:1 or more was obtained in the range of viewing angles of 80° or more in azimuth directions except 90° azimuth, and thus the sufficient viewing angles were obtained.

As shown in FIG. 10A, in the second example of structure, the second retardation plate R2 is disposed between the first polarizer plate PL1 and the first retardation plate R1 in the first optical compensation element 40, and the absorption axis of the first polarizer plate PL1 and the optical axis of the second retardation plate R2 substantially agree with each other. The invention, however, is not limited to this example. Specifically, in the liquid crystal display panel 1, the first optical compensation element 40 and second optical compensation element 50 may substantially be transposed.

Figure 9B:
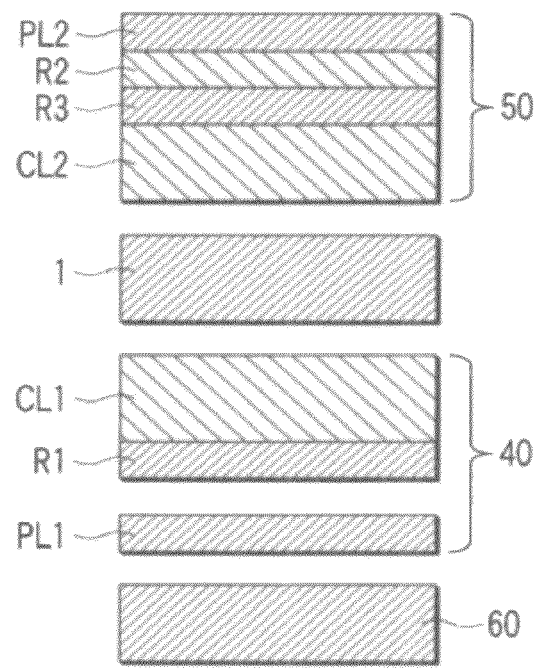
FIG. 9B schematically shows still another structure of the transmissive liquid crystal display device or a transreflective liquid crystal display device according to the embodiment of the present invention.

To be more specific, in Modification 2, as shown in FIG. 9B and FIG. 10A, the second retardation plate R2 is not disposed in the first optical compensation element 40, and the second retardation plate R2 is disposed between the second polarizer plate PL2 and the third retardation plate R3 in the second optical compensation element 50. The optical axis of the second retardation plate R2 in its X-Y plane is set at 135°. In short, the absorption axis of the second polarizer plate PL2 substantially agrees with the optical axis of the second retardation plate R2. In this Modification 2, the same advantageous effects as in the above-described second example of structure can be obtained by making use of the second retardation plate R2 in which the Nz coefficient is set in the range of between 0.4 and 0.6.

For example, it was confirmed that a sufficient viewing angle was obtained in the case where the Nz coefficient in the second retardation plate R2 of the second optical compensation element 50 was set at 0.5.

In the second example of structure, in the case where the second retardation plate R2 is disposed in the first optical compensation element 40 and the absorption axis of the first polarizer plate PL1 is substantially perpendicular to the optical axis of the second retardation plate R2 (e.g. the absorption axis of the first polarizer plate PL1 is set at 45° azimuth and the optical axis of the second retardation plate R2 in the X-Y plane is set at 135° azimuth) and in the case where the second retardation plate R2 is disposed in the second optical compensation element 50 and the absorption axis of the second polarizer plate PL2 is substantially perpendicular to the optical axis of the second retardation plate R2 (e.g. the absorption axis of the second polarizer plate PL2 is set at 135° azimuth and the optical axis of the second retardation plate R2 in the X-Y plane is set at 45° azimuth), it should suffice to use the second retardation plate R2 in which the Nz coefficient is set in the range of between 0.4 and 0.6. In each of these cases, the same advantageous effects as in the above-described second example of structure can be obtained.

As regards the above-described first example of structure and the second example of structure, in the case where the example of structure as shown in FIG. 4B is applied to at least one of the first compensation layer CL1 and second compensation layer CL2, the same advantageous effects can be obtained by setting the optical axis of the retardation plate RB in its X-Y plane at 90° azimuth.

Figure 10C:
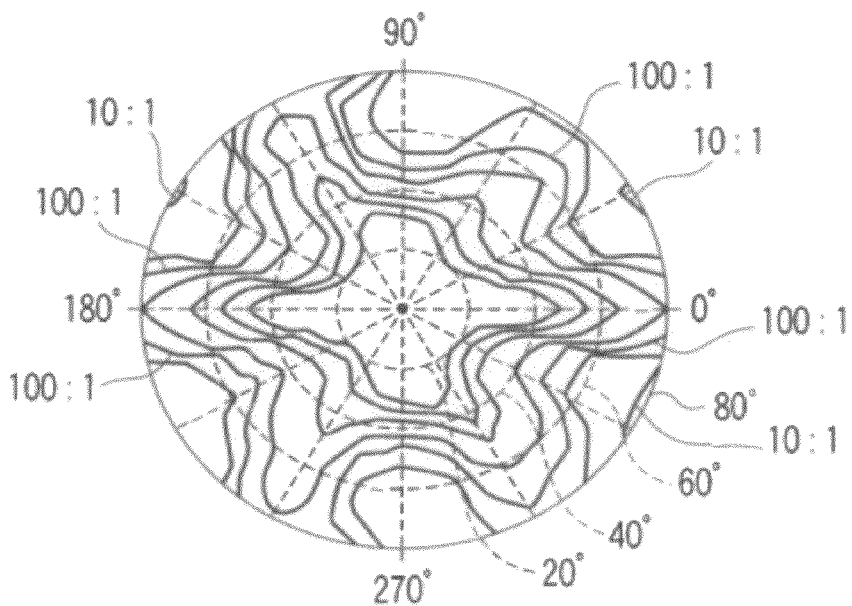
FIG. 10C shows a result of simulation of a viewing angle dependency of a contrast ratio in another transmissive liquid crystal display device according to the present embodiment.

For example, as regards the first example of structure, in the case where the first compensation layer CL1 and second compensation layer CL2 were composed of the retardation plates RB, the Nz coefficient of each retardation plate RB was set at 4.8, the retardation Re of each retardation plate RB was set at 90 nm, the Nz coefficient of the second retardation plate R2 of the first optical compensation element 40 was set at 0.2 and the Nz coefficient of the fourth retardation plate R4 of the second optical compensation element 50 was set at 0.8, it was confirmed, as shown in FIG. 10C, that sufficient viewing angles were obtained.

For example, as regards the second example of structure, in the case where the first compensation layer CL1 and second compensation layer CL2 were composed of the retardation plates RB and the Nz coefficient of the second retardation plate R2 of the second optical compensation element 50 was set at 0.5, it was confirmed that sufficient viewing angles were obtained.

As regards the above-described first example of structure and the second example of structure, in the case where the example of structure as shown in FIG. 4C is applied to at least one of the first compensation layer CL1 and second compensation layer CL2, the same advantageous effects can be obtained by setting the optical axis of the retardation plate Rwv in its X-Y plane at 0° azimuth.

Furthermore, as regards the above-described first example of structure and the second example of structure, in the case where the example of structure as shown in FIG. 4D is applied to at least one of the first compensation element 40 and second compensation element 50, the same advantageous effects can be obtained by setting the optical axis of the first retardation plate R1 in its X-Y plane at 0° azimuth and by setting the optical axis of the retardation plate RA in its X-Y plane at 90° azimuth.

《Transreflective Liquid Crystal Display Device》

Figure 11:
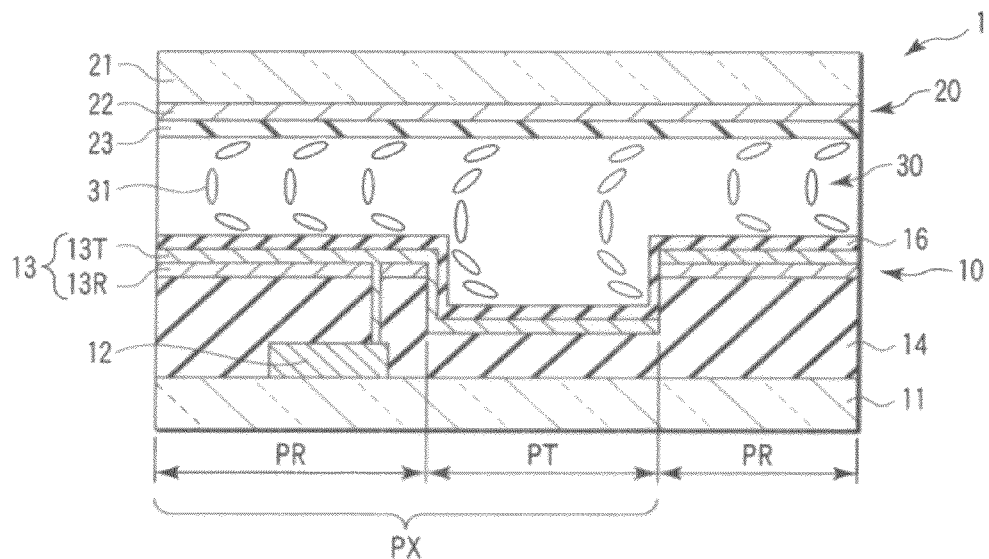
FIG. 11 schematically shows the structure of an OCB mode transreflective liquid crystal display panel which is applicable to the liquid crystal display device shown in FIG. 1.

Next, a transreflective liquid crystal display device according to the embodiment of the invention is described. The structure of the transreflective liquid crystal display device is as shown in FIG. 11. The basic structure of this transreflective liquid crystal display device is the same as that of the transmissive liquid crystal display device shown in FIG. 3. However, the structure of transreflective liquid crystal display device differs from that of the transmissive liquid crystal display device in that each of a plurality of display pixels PX, which are arrayed in a matrix, includes a reflective part PR that displays an image by selectively reflecting ambient light, and a transmissive part PT that displays an image by selectively transmitting light from a backlight 60.

In the array substrate 10, the insulation layer 14 forms a gap difference of the liquid crystal layer 3, thereby to impart a retardation difference between the reflective part PR and the transmissive part PT. Each pixel electrode 13 includes a reflective electrode 13R which is provided in association with the reflective part PR, and a transmissive electrode 13T which is provided in association with the transmissive part PT. These electrodes 13R and 13T are electrically connected to each other, and are controlled by one switching element W. The reflective electrode 13R is formed of a light-reflective electrically conductive material such as aluminum. The transmissive electrode 13T is formed of a light-transmissive electrically conductive material such as indium tin oxide (ITO). The reflective electrode 13R and transmissive electrode 13T are electrically connected to the switching element 13.

In the example shown in FIG. 11, in the transmissive part PT and reflective part PR, liquid crystal molecules 31 are bend-aligned between the array substrate 10 and counter-substrate 20 in a predetermined display state in which a voltage is applied to the liquid crystal layer 30.

To this transreflective liquid crystal display device, too, applicable are the first optical compensation element 40 and second optical compensation element 50 according to any one of the first example of structure shown in FIG. 1, its Modification 1, the second example of structure shown in FIG. 9A and its Modification 2 shown in FIG. 9B. In addition, any one of the structures shown in FIG. 4A to FIG. 4D is applicable to the first optical compensation element 40 and second optical compensation element 50.

Next, verification was conducted on the advantageous effects that are obtained in the case where the first optical compensation element 40 and second optical compensation element 50 according to the first example of structure are applied to the above-described transreflective liquid crystal display. The structure of the transreflective liquid crystal display device according to the present embodiment is as shown in FIG. 1. The Nz coefficient of the second retardation plate R2 of the first optical compensation element 40, which is disposed on the outer surface of the array substrate 10, was set at 0.9 (nx=1.580951, ny=1.578995, nz=1.579191), and the Nz coefficient of the fourth retardation plate R4 of the second optical compensation element 50, which is disposed on the outer surface of the counter-substrate 20, was set at 0.2 (nx=1.580951, ny=1.578995, nz=1.580560). In a comparative example, a first optical compensation element 40 including no second retardation plate and a second optical compensation element 50 including no fourth retardation plate were applied to a transreflective liquid crystal display device, with the other structural aspects being the same as in the present embodiment.

Figure 12A:
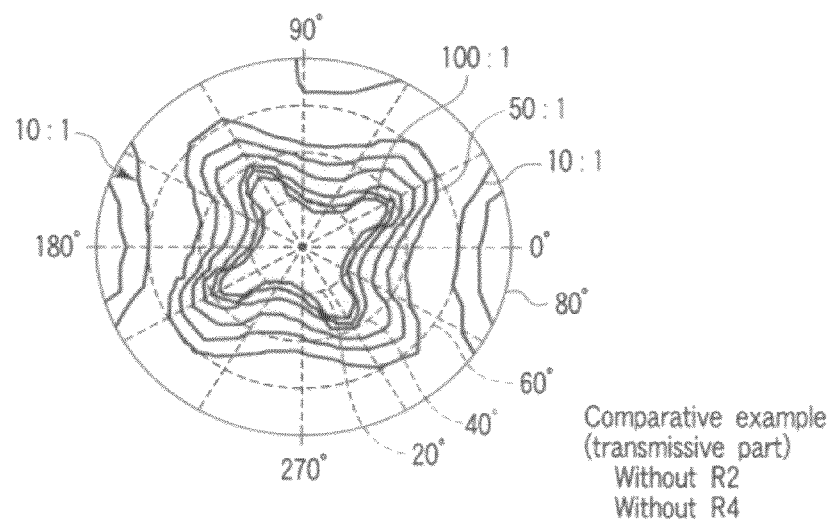
FIG. 12A shows a result of simulation of a viewing angle dependency of a contrast ratio in a transmissive part of a transreflective liquid crystal display device according to a comparative example.
Figure 12B:
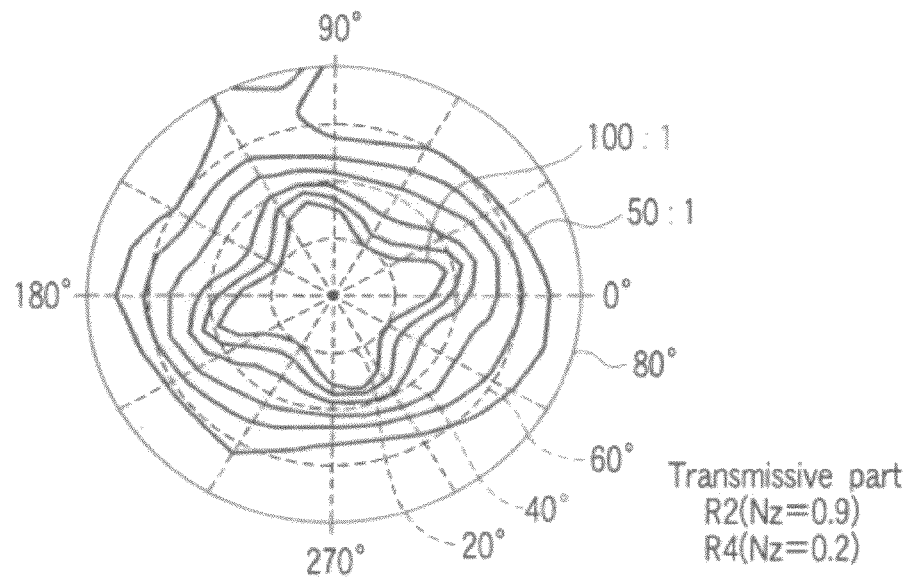
FIG. 12B shows a result of simulation of a viewing angle dependency of a contrast ratio in a transmissive part of the transreflective liquid crystal display device according to the present embodiment.

As is shown in FIG. 12A, as regards the transreflective liquid crystal display device according to the comparative example, it is understood that in the transmissive part a contrast ratio of 10:1 or less is obtained in the range of viewing angles of 60° or more, in particular, at 0° azimuth and 180° azimuth. On the other hand, as is shown in FIG. 12B, as regards the transreflective liquid crystal display device according to the present embodiment, it is understood that in the transmissive part a contrast ratio of 10:1 or more is obtained in the range of viewing angles of 80° or more at all azimuth directions of the screen, and sufficient viewing angles are obtained, compared to the comparative example.

Figure 13A:
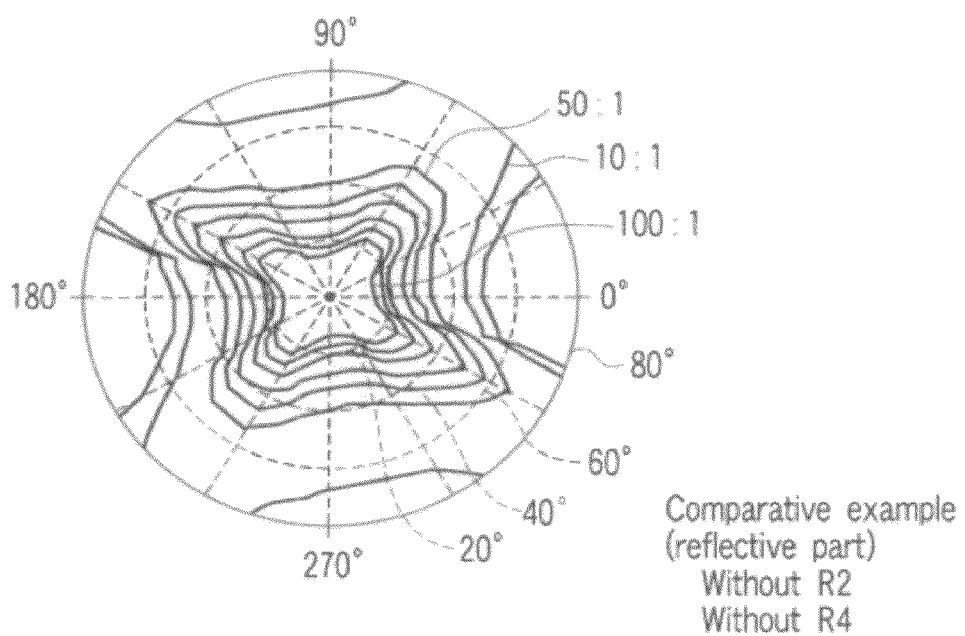
FIG. 13A shows a result of simulation of a viewing angle dependency of a contrast ratio in a reflective part of the transreflective liquid crystal display device according to the comparative example.
Figure 13B:
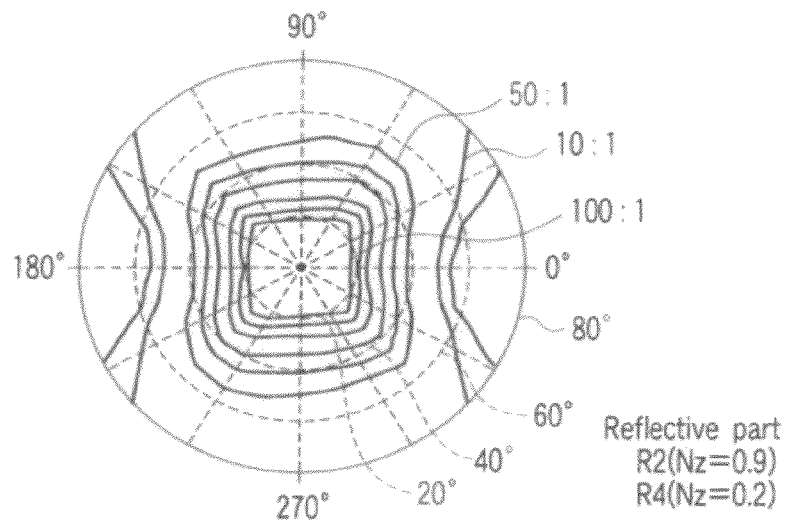
FIG. 13B shows a result of simulation of a viewing angle dependency of a contrast ratio in a reflective part of the transreflective liquid crystal display device according to the present embodiment.

As is shown in FIG. 13A, as regards the transreflective liquid crystal display device according to the comparative example, it is understood that in the reflective part a contrast ratio of 10:1 or less is obtained in the range of viewing angles of 40° or more, in particular, at 0° azimuth and 180° azimuth. On the other hand, as is shown in FIG. 13B, as regards the transreflective liquid crystal display device according to the present embodiment, it is understood that in the reflective part a contrast ratio of 10:1 or more is obtained in the range of viewing angles of 80° or more at 90°-720° azimuth and a contrast ratio of 10:1 or more is obtained in the range of viewing angles of 50° or more at 0°-180° azimuth. It was confirmed that the viewing angle was increased, compared to the comparative example.

Next, verification was conducted on the advantageous effects that are obtained in the case where the first optical compensation element 40 and second optical compensation element 50 according to the second example of structure are applied to the transreflective liquid crystal display. The structure of the transreflective liquid crystal display device according to the present embodiment is as shown in FIG. 9A. The Nz coefficient of the second retardation plate R2 of the first optical compensation element 40, which is disposed on the outer surface of the array substrate 10, was set at 0.5 (nx=1.580951, ny=1.578995, nz=1.579973). The viewing angle dependency of the contrast ratio in the transreflective liquid crystal display device according to the present embodiment was simulated, and it was confirmed that a contrast ratio of 10:1 or more was obtained in both the transmissive part and reflective part in the range of viewing angles of 60° or more in all azimuth directions of the screen, and a contrast ratio of 10:1 or more was obtained in the transmissive part in the range of viewing angles of 80° or more at azimuth directions except 90° azimuth, and thus the sufficient viewing angles were obtained.

《Reflective Liquid Crystal Display Device》

Figure 14:
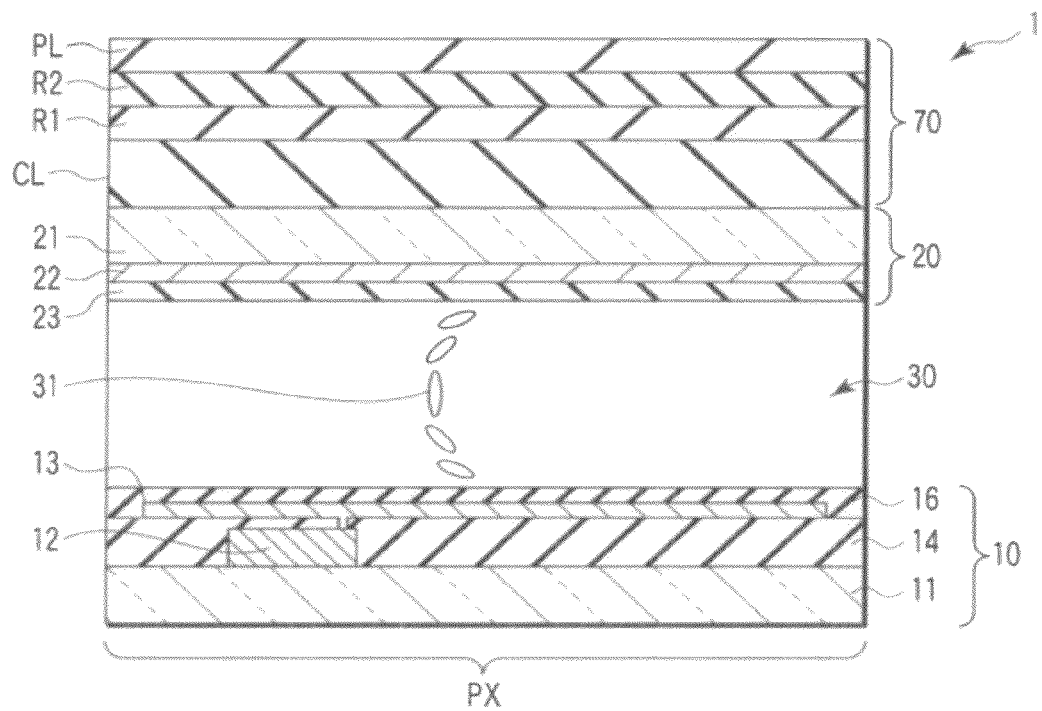
FIG. 14 schematically shows the structure of an OCB mode reflective liquid crystal display device according to an embodiment of the invention.

Next, a reflective liquid crystal display device according to the embodiment of the invention is described. The structure of the reflective liquid crystal display device is as shown in FIG. 14. The basic structure of this reflective liquid crystal display device is the same as that of the transmissive liquid crystal display device shown in FIG. 3. However, the structure of reflective liquid crystal display device differs from that of the transmissive liquid crystal display device in that the array substrate 10 includes reflective electrodes as pixel electrodes 13. Each pixel electrode 13 is formed of a light-reflective electrically conductive material such as aluminum. In short, each pixel PX corresponds to a reflective part.

In this reflective liquid crystal display device, an optical compensation element 70 is disposed on only the outer surface of the counter-substrate 20. The optical compensation element 70 is configured to include a polarizer plate PL, a first retardation plate (¼ wavelength plate) R1 which is disposed between the polarizer plate PL and the liquid crystal display panel 1, a second biaxial retardation plate (¼ wavelength plate) R2 which is disposed between the polarizer plate PL and the liquid crystal display panel 1, and a compensation layer CL which is disposed between the first retardation plate R1 and the liquid crystal display panel 1. Any one of the examples of structure shown in FIG. 4A to FIG. 4D is applicable to the optical compensation element 70.

A description is given of the case in which the compensation layer CL in the optical compensation element 70 is composed of the retardation plate RA and retardation plate RC as shown in FIG. 4A.

Specifically, in the liquid crystal display panel 1, the rubbing direction is set at 0° azimuth. In the optical compensation element 70, the absorption axis of the polarizer plate PL is set at 135° azimuth. The optical axis of the second retardation plate R2 in the X-Y plane is set at 45° azimuth (i.e. substantially perpendicular to the absorption axis of the polarizer plate PL). The optical axis of the first retardation plate R1 in the X-Y plane is set at 90° azimuth, and the optical axis of the retardation plate RA in the X-Y plane is set at 90° azimuth.

The above-described axial angles of the respective structural elements are summarized in FIG. 15.

In this reflective liquid crystal display device, too, use is made of the optical compensation element having the function of optically compensating the difference of the polarization state, which varies depending on the influence of optical rotatory power that differs between azimuth directions of light passing through the liquid crystal layer 30, and also optically compensating the shift of the polarization state of light, which passes through the first retardation plate R1, from the azimuth direction of the absorption axis of the polarizer plate PL. Thereby, the contrast can be improved, and the viewing angle at which a high contrast is obtained can be increased.

Specifically, in the optical compensation element 70 of the reflective liquid crystal display device, the second retardation plate R2 with biaxial refractive index anisotropy, which is disposed between the first retardation plate R1 and the polarizer plate PL, compensates the difference of the polarization state which varies due to the influence of optical rotatory power, depending on the azimuth direction of the light that is incident from the observation side and passes through the liquid crystal layer 30. In addition, the second retardation plate R2 compensates the shift of the polarization state of the light, which is reflected by each pixel electrode 13 and passes through the first retardation plate R1, from the azimuth direction of the absorption axis of the polarizer plate PL.

In the structure in which the optical axis of the second retardation plate R2 in the X-Y plane is substantially perpendicular to the absorption axis of the polarizer plate PL, it is desirable to use the second retardation plate R2 in which the Nz coefficient is set in the range of between 0.15 and 0.3. If the Nz coefficient is less than 0.15 or greater than 0.3, the optical compensation becomes deficient and it is difficult to secure the viewing angle contrast.

Thereby, a sufficiently wide viewing angle can be obtained, and a good display quality can be obtained.

Next, verification was conducted on the advantageous effects that are obtained in the case where the optical compensation element 70 is applied to the above-described reflective liquid crystal display. The structure of the reflective liquid crystal display device according to the present embodiment is as shown in FIG. 14. The Nz coefficient of the second retardation plate R2 of the optical compensation element 70 was set at 0.2 (nx=1.580951, ny=1.578995, nz=1.580560). In a comparative example, an optical compensation element 70 including no second retardation plate was applied to a reflective liquid crystal display device, with the other structural aspects being the same as in the present embodiment.

Figure 16A:
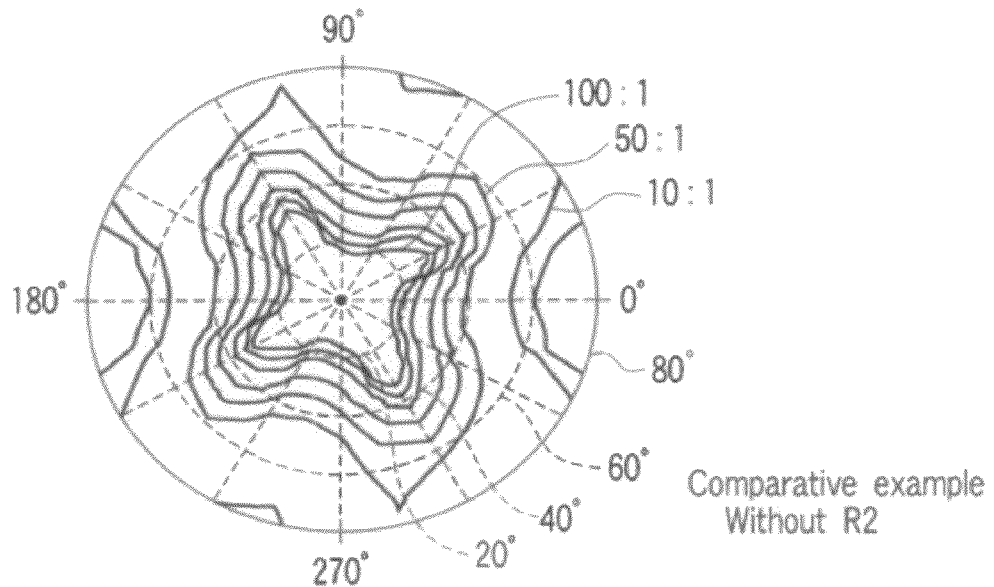
FIG. 16A shows a result of simulation of a viewing angle dependency of a contrast ratio in a reflective liquid crystal display device according to a comparative example.
Figure 16B:
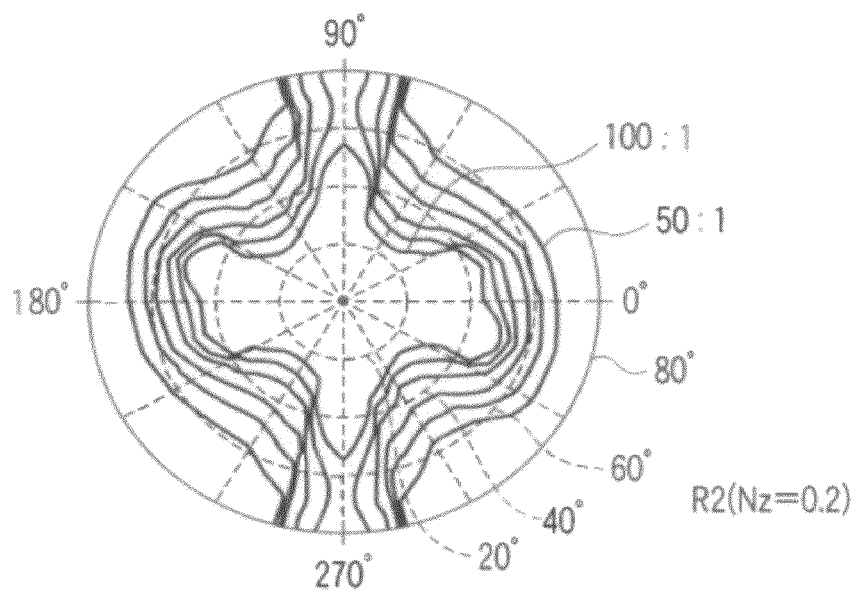
FIG. 16B shows a result of simulation of a viewing angle dependency of a contrast ratio in the reflective liquid crystal display device according to the present embodiment.

As is shown in FIG. 16A, as regards the reflective liquid crystal display device according to the comparative example, it is understood that a contrast ratio of 10:1 or less is obtained in the range of viewing angles of 50° or more, in particular, at 0° azimuth and 180° azimuth. On the other hand, as is shown in FIG. 16B, as regards the reflective liquid crystal display device according to the present embodiment, it is understood that a contrast ratio of 10:1 or more is obtained in the range of viewing angles of 80° or more at all azimuth directions of the screen, and sufficient viewing angles are obtained, compared to the comparative example.

The same advantageous effects were confirmed as regards another structure of the reflective liquid crystal display device according to the present embodiment, wherein the Nz coefficient of the second retardation plate R2 of the optical compensation element 70 was set at 0.15 (nx=1.580951, ny=1.578995, nz=1.580658).

Further, the same advantageous effects were confirmed as regards still another structure of the reflective liquid crystal display device according to the present embodiment, wherein the Nz coefficient of the second retardation plate R2 of the optical compensation element 70 was set at 0.3 (nx=1.580951, ny=1.578995, nz=1.580364).

In the case where the Nz coefficient in the comparative example was set at 0.5 (nx=1.580951, ny=1.578995, nz=1.579973), a high viewing angle contrast could not be secured, as in the above-described comparative example.

As shown in FIG. 15, in the example of structure, the absorption axis of the polarizer plate PL and the optical axis of the second retardation plate R2 substantially agree in the optical compensation element 70. The invention, however, is not limited to this example. Specifically, in a modification of this structure, in the optical compensation element 70, the optical axis of the second retardation plate R2 in the X-Y plane is set at 135°. Thus, the absorption axis of the polarizer plate PL and the optical axis of the second retardation plate R2 substantially agree with each other. In this modification, the same advantageous effects as in the above-described structure can be obtained by using the second retardation plate R2 in which the Nz coefficient is set in the range of between 0.7 and 0.9.

The present invention is not limited directly to the above-described embodiments. In practice, the structural elements can be modified without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined.

What is claimed is:

1. A liquid crystal display device comprising:
an OCB mode liquid crystal display panel comprising a first substrate including a first alignment film, a second substrate including a second alignment film, and a liquid crystal layer which is held between the first alignment film and the second alignment film, a rubbing direction of the first alignment film and the second alignment film agrees with a reference azimuth direction; and
a first optical compensation element which is disposed outside the first substrate and a second optical compensation element which is disposed outside the first substrate, the first optical compensation element and the second optical compensation element optically compensating a retardation of the liquid crystal layer in a predetermined display state in which a voltage is applied to the liquid crystal layer;
wherein the first optical compensation element includes: a first polarizer plate having a first absorption axis which intersects at 45° with respect to the reference azimuth direction, a first retardation plate which is disposed between the first polarizer plate and the liquid crystal display panel, includes a first slow axis parallel with the reference azimuth direction, and imparts a phase difference of a ¼ wavelength; a second retardation plate which is disposed between the first polarizer plate and the first retardation plate, includes a second slow axis parallel with the first absorption axis, and has a biaxial refractive index anisotropy; a third retardation plate corresponding to an A-plate which is disposed between the first retardation plate and the liquid crystal display panel and includes a third slow axis perpendicular to the reference azimuth direction, and a fourth retardation plate corresponding to a C-plate which is disposed between the first retardation plate and the third retardation plate;
the second optical compensation element includes: a second polarizer plate having a second absorption axis which intersects at 135° with respect to the reference azimuth direction; a fifth retardation plate which is disposed between the second polarizer plate and the liquid crystal display panel, includes a fifth slow axis perpendicular to the reference azimuth direction, and imparts a phase difference of a ¼ wavelength; a sixth retardation plate which is disposed between the second polarizer plate and the fifth retardation plate, includes a sixth slow axis perpendicular to the second absorption axis, and has a biaxial refractive index anisotropy; a seventh retardation plate corresponding to an A-plate which is disposed between the fifth retardation plate and the liquid crystal display panel and includes a seventh slow axis perpendicular to the reference azimuth direction; and an eighth retardation plate corresponding to a C-plate which is disposed between the fifth retardation plate and the seventh retardation plate, and
the second retardation plate has the refractive index anisotropy which is set in such a manner as to compensate (a) a difference of a polarization state due to an influence of optical rotary power that differs between azimuth directions of light passing through the liquid crystal layer and to compensate (b) a shift of the polarization state of light, which passes through the first retardation plate, from an azimuth direction of the first absorption axis of the first polarizer plate.

2. The liquid crystal display device according to claim 1, wherein an Nz coefficient in the second retardation plate is set in a range of between 0.7 and 0.9, the Nz coefficient being given by $$Nz=(nx-nz)/(nx-ny),$$

wherein nx and ny are refractive indices in mutually perpendicular directions in a plane of the second retardation plate, and nz is a refractive index in a normal direction to the second retardation plate.

3. The liquid crystal display device according to claim 2, wherein an Nz coefficient in the sixth retardation plate is set in a range of between 0.15 and 0.3, the Nz coefficient being given by $$Nz=(nx-nz)/(nx-ny),$$

wherein nx and ny are refractive indices in mutually perpendicular directions in a plane of the sixth retardation plate, and nz is a refractive index in a normal direction to the sixth retardation plate.

* * * * *